April 7, 1936. O. HOOVER 2,036,941
INTERNAL COMBUSTION ENGINE
Filed June 20, 1931 2 Sheets-Sheet 1
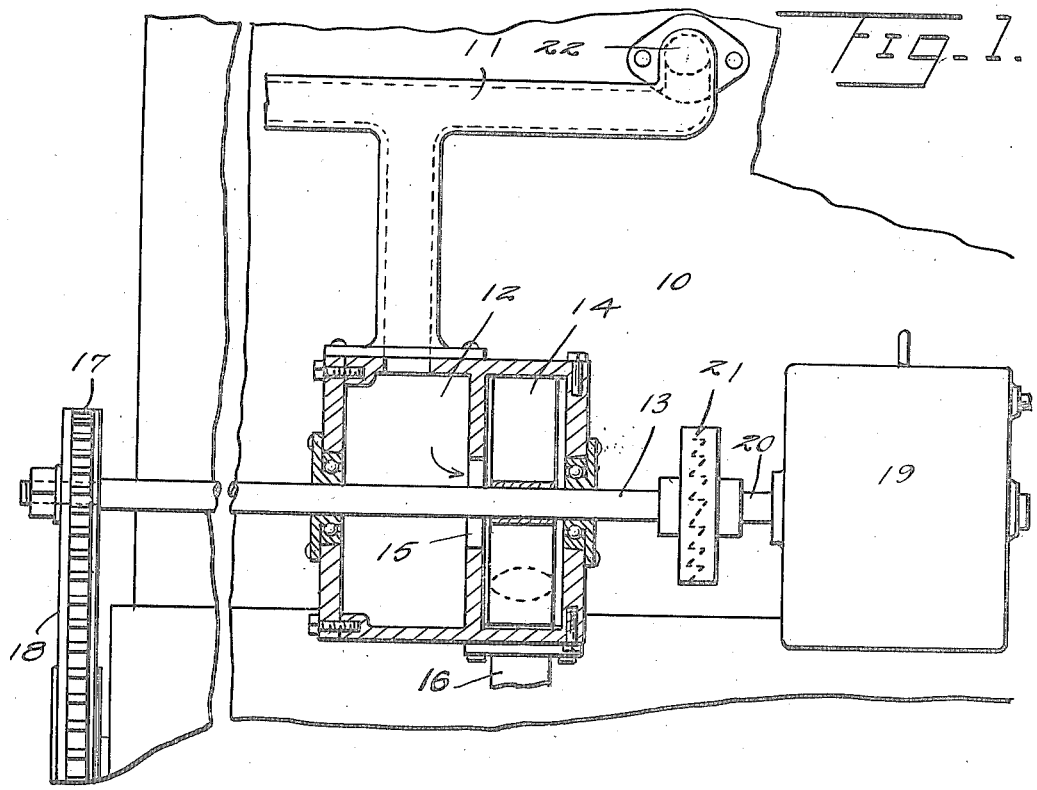
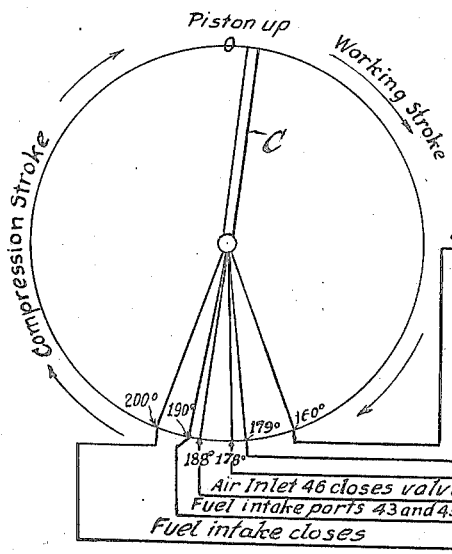
Inventor
Otto Hoover
By Watson E. Coleman
Attorney April 7, 1936.                    O. HOOVER                    2,036,941
                        INTERNAL COMBUSTION ENGINE
                          Filed June 20, 1931              2 Sheets-Sheet 2
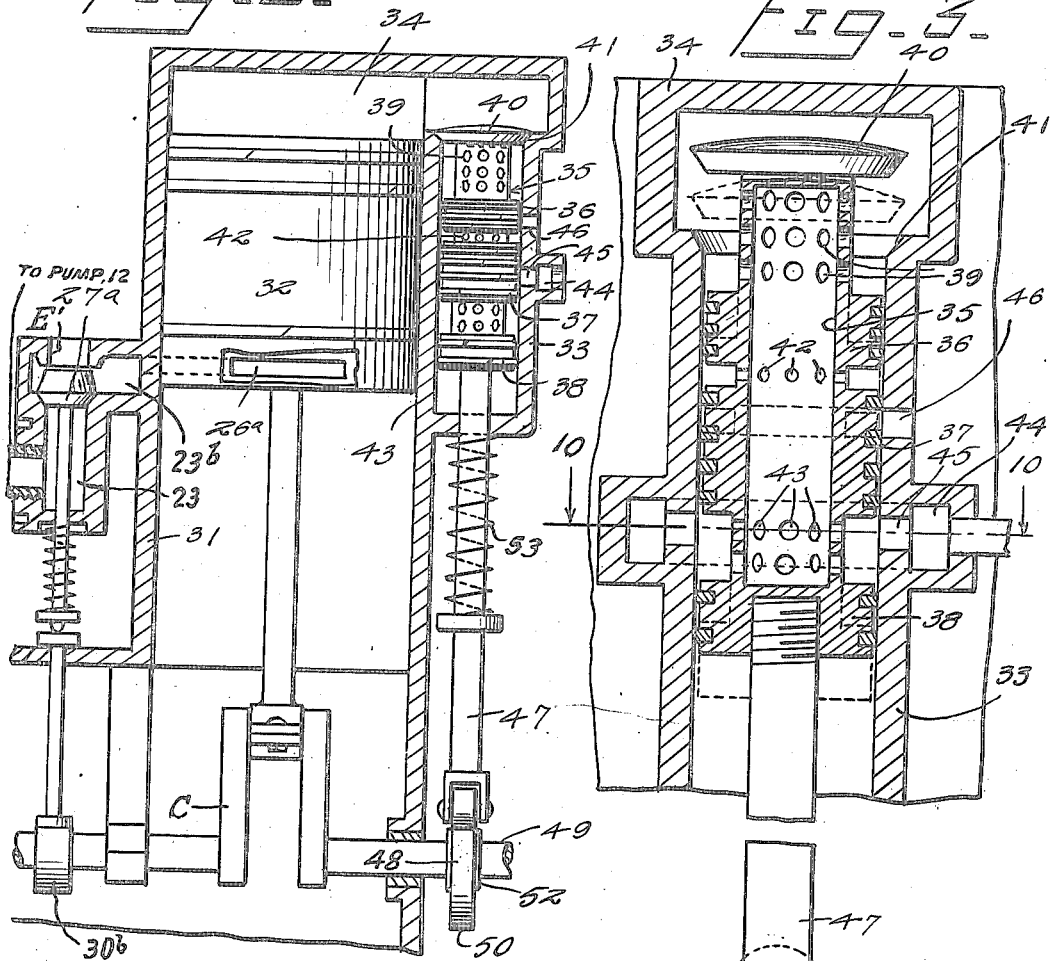
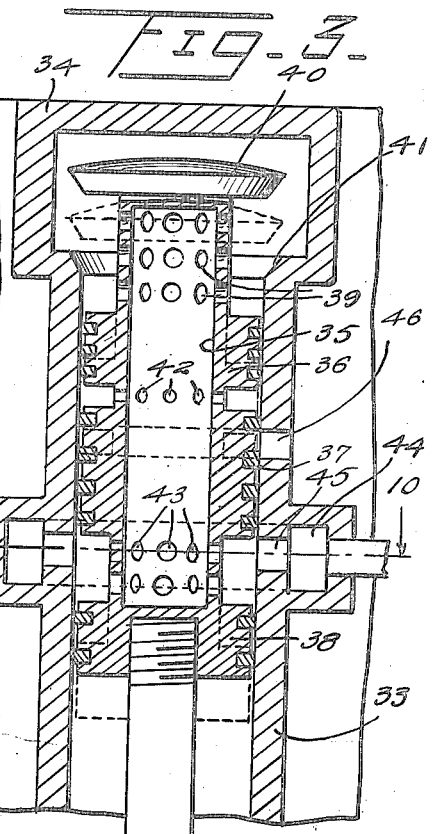
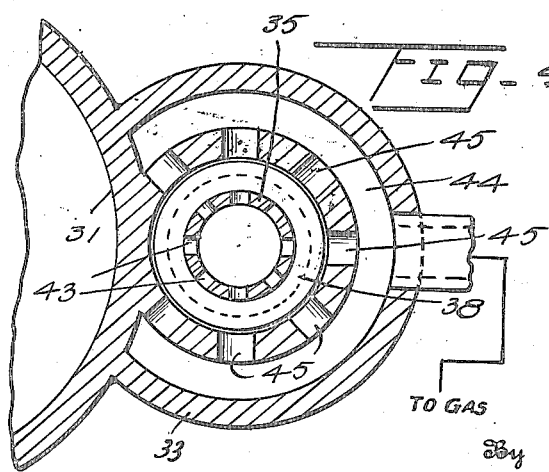
Inventor
Otto Hoover
By Watson E. Coleman
Attorney Patented Apr. 7, 1936

2,036,941

UNITED STATES PATENT OFFICE 2,036,941

INTERNAL COMBUSTION ENGINE

Otto Hoover, East St. Louis, Ill.

Application June 20, 1931, Serial No. 545,732

3 Claims. (Cl. 123—65)

This invention relates to internal combustion engines and particularly to the means for scavenging the cylinders thereof after a working stroke.

The general object of the invention is to provide means whereby the products of combustion upon the completion of the working stroke may be positively withdrawn from the cylinders and in addition provide means whereby fresh air may be admitted to the cylinder while the exhaust port is open to thereby scavenge the cylinder and permit the exhaust gases and the air to be positively withdrawn therefrom just prior to the opening of the fuel inlet valve.

A still further object is to provide a charge and air inlet valve of improved form which upon an initial opening movement at the time that the exhaust port is open will permit the inlet of air to the cylinder to drive out the exhaust gases and scavenge the cylinder, then cut off the inlet of air and admit a charge of gas and to provide in connection with this inlet valve a positively operated valve for opening or closing communication from the cylinder to the exhaust means.

Other objects will appear in the course of the following description.

My invention is illustrated in the accompanying drawings, wherein:—

Figure 1 is a fragmentary side elevation of a portion of an engine showing the exhaust means in section;

Figure 2 is a vertical section through a two-cycle internal combustion cylinder showing the exhaust valve and my improved air and charge inlet valve;

Figure 3 is an enlarged longitudinal section of the valve and its casing showing the valve raised for the admission of a charge;

Figure 4 is a section on the line 10—10 of Figure 3.

Figure 5 is a diagram showing different positions of the engine crank shown in Figure 2 and the position of the air and fuel valve at different positions of the crank.

As before stated, one of the objects of the invention is to provide means whereby the exhausted gases and products of combustion may be positively withdrawn from an engine cylinder after the working stroke thereof either in a four-cycle engine or a two-cycle engine and whereby fresh air may be drawn into the cylinder and then withdrawn therefrom so as to fully scavenge the engine.

In Figure 1, I have illustrated a portion of an engine block 10 with an exhaust manifold 11 extending therefrom. This exhaust manifold 11 leads into an exhaust chamber 12 through which a shaft 13 passes carrying upon it the exhaust fan 14. This fan may be of any suitable construction but is disposed as shown in Figure 1 in a fan casing having an inlet aperture 15 and a tangential discharge port 16. It will be understood, however, that any desirable form of exhaust fan or exhaust mechanism may be used. The shaft 13 at one end carries upon it a gear whereby it may be operatively connected to the crank shaft of the motor. As illustrated, it carries upon it a sprocket wheel 17 connected by a sprocket chain 18 to a sprocket wheel on the crank shaft. Associated with the shaft is an electric starting motor 19 having its shaft 20 connected by an overrunning clutch 21 of any suitable character to the shaft 13. In starting the engine, this electric motor is energized which drives the shaft 13 until the engine picks up and when this occurs, the automatic clutch 21 which may be of any suitable or usual construction throws out the connection to the electric motor which may be either manually or automatically stopped.

In Figures 2, 3 and 4, I show a combined scavenging and intake valve which I use in conjunction with means whereby fresh air may be positively carried into the cylinder and follow products of combustion as they are exhausted and whereby a charge may be positively carried into the cylinder, such means being preferably of the character heretofore described whereby the exhaust may be positively withdrawn from the cylinder and the air and motive fluid drawn in. I have shown this valve in conjunction with the cylinder 31 of a two-cycle engine, but I do not wish to be limited to its use with a two-cycle engine. The piston 32 is of the ordinary type and the engine block may be constructed in any usual manner. The vacuum valve or auxiliary exhaust valve 27a operates in connection with the exhaust port 26a as previously described and its casing 23 is connected to the pipe 11 in the manner shown in Figure 1.

Disposed on one side of the cylinder is the intake valve casing 33 which opens at its upper end into the head 34. Operating within the valve casing is the valve shown in detail in Figure 3 and designated 35. This valve is hollow and has the three, spaced, piston-like portions 36, 37 and 38. The tubular or hollow valve body extends beyond the piston 36 and is perforated at 39 with a plurality of rows of perforations and carries at its upper end the valve head 40 which, when the valve is lowered, closes against the seat 41 formed in the upper end of the casing. Between the two pistons 36 and 37, the tubular valve is formed with perforations 42 leading into the annular space between the two pistons 36 and 37 and between the pistons 37 and 38 the tubular or hollow valve is formed with the perforations 43. When the valve is raised as shown in full lines in Figure 3, the perforations 43 open into the nearly annular chamber 44 formed in the valve casing and connected to a source of gas. When the valve is fully lowered, the valve head 40 is closed against the seat 41 and the piston 37 closes the ports 45 leading from the chamber 44.

The casing is also provided with a port or ports 46 leading into the open air and when the valve is partly raised from its fully lowered position, as for instance to the position shown in dotted lines in Figure 3, the port 42 will register with the port or ports 46 and fresh air will be received into the interior of the valve and discharged through the perforations 39 into the cylinder of the engine. The valve stem is designated 47 and is actuated by means of a cam 48 mounted upon the crank shaft 49 of the engine. This cam is formed to provide a relatively high portion 50 and a slightly lower portion 51, the cam then merging into the portion 52 which is concentric to the shaft. The cam moves in the direction of the arrow in Figure 3 and when the face 51 reaches the lower end of the stem, the valve is raised against the action of the spring 53 to allow fresh air to enter through the port 46 and passing through the perforations 42 pass into the interior of the head 34. This occurs as the piston uncovers the exhaust port 26a. This fresh air sweeps out the exhaust gases which are withdrawn past the valve 27a by the suction fan and then as the piston valve 35 moves still further upward, the air port 46 is closed, as shown in full lines in Figure 3 and the perforations 43 receive the charge from the chamber 44 and this charge passes upward through the perforations 39 into the upper end of the cylinder sweeping out the fresh air through the exhaust port.

As soon as the engine is charged and the piston moving upward on its compression stroke, the valve 35 is lowered, the valve head 40 closes against its seat 41, the ports 46 are closed by the portion 36 and the ports 45 are closed by the piston portion 37.

Of course, the piston portions 36, 37 and 38 are provided with packing rings to prevent the passing of the charge or of air around these piston portions. The valve, of course, remains lowered upon the compression stroke of the piston and upon the firing stroke and until the port 26a is again uncovered.

While I have illustrated this combined fresh air and intake valve as being applied to a two cycle engine, I do not wish to be limited to this, as obviously this valve may be applied to a four cycle engine, the only difference being that the valve will be opened to allow fresh air to enter the cylinder toward the end of the exhaust stroke of the piston so that this fresh air will scavenge the engine, the valve will then move to the full line position in Figure 3 upon the intake stroke of the piston to permit the intake of motive fluid, will entirely close upon the compression stroke of the piston, and remain closed throughout this compression stroke and the following working stroke. It will be obvious that the movement of the valve can be controlled entirely by the form of the cam 48 and its timing.

While I have heretofore referred to the fact that the exhaust valve 27a when opened causes the positive exhaust of burned gases from the interior of the cylinder, yet primarily its function is to cause the gases that are left in the cylinder to be drawn out and the gas or air to be drawn into the cylinder of a two-cycle engine before the piston is started upward. By my mechanism, I provide means whereby the charging of the cylinder is produced by a positive withdrawal of the burned gases and the positive indraft of the charge.

While I have illustrated the cams for operating the vacuum or exhaust valve 27a and operating the air and inlet valve 35 as being mounted upon or operated by the crank shaft, obviously I do not wish to be limited to this as these instrumentalities may be operated by other shafts driven in time with the engine.

Preferably the engine will have the usual exhaust port E' as well as the port controlled by the valve 27a, though I do not wish to be limited to this. Thus in Figure 2, the usual exhaust port is designated E' and while a large number of different valve mechanisms might be used for closing this exhaust port E' while the valve 27a was open, yet as a simple means for performing this action, I cause the valve 27a to close the port E' when the valve 27a is raised and open the port E' when the valve 27a closes against its seat in the valve casing 23. The reason for using the main exhaust port as well as a secondary exhaust port is that if a main exhaust port such as E' is not used, the hot exhaust gases before they are slightly cooled will cause the vacuum pump and its parts to become overheated but by having a main exhaust port E', the very hot gases will be exhausted through this port. The valve 27a will then close this port and the remaining gases which have been cooled somewhat will pass out through the casing 23 to the vacuum pump and thus the pump and allied parts will not become overheated. I, therefore, wish it to be distinctly understood that I may use my vacuum valve 27a either in connection with the usual exhaust port and means for controlling the exhaust pressure or use the port controlled by the valve 27a as means for carrying away all of the exhaust gases. Thus all the exhaust gases may be exhausted through the casing 23 into the vacuum pump or part of the exhaust gases may pass through the port in the upper end of the casing 23 to be followed by the fresh air entering the engine to thus scavenge the engine cylinders. Thus when the piston 32 has just moved below the exhaust port 26a, the very hot exhaust gases will pass out through port E'. Then the valve 27a will open and the exhaust port E' will be closed and the remainder of the gases will pass through the casing 23 to be followed by scavenging air, this air in turn being followed by the fuel admitted when the valve 35 is fully raised, the exhaust port 26a being closed by the upward movement of the piston when the cylinder is full of fuel gas, the valve 35 closing at the same time. This valve 27a may be so timed that it will only withdraw the fresh air for scavenging purposes while all of the combustion gases will pass out through the port E'. Therefore, in the claims, it is to be understood that the term "exhaust valve" is designed to cover either a valve which does carry off all of or part of the exhaust gases or a valve used only to exhaust fresh air entering the engine cylinder.

I claim:—

1. In an internal combustion engine, a cylinder, a hollow inlet valve casing communicating with the interior of the cylinder and having a port communicating with the exterior air and a port communicating with a source of fuel and a hollow inlet valve operating within said cylinder and in one position opening communication between the interior of the valve and the cylinder and simultaneously opening communication between the exterior air and the interior of the valve and in another position closing communication between the exterior air and the interior of the valve and opening communication between the source of fuel and the interior of the valve, and means for reciprocating said valve within the casing.

2. In an internal combustion engine, a cylinder, an inlet valve casing associated therewith, the valve casing having a seat at its upper end, an air inlet port below the seat and a fuel inlet port, a hollow piston valve operating within said valve casing and having a head adapted to engage said seat, the upper end of the valve just below the head being formed with perforations communicating with the interior of the cylinder when the valve is lifted, the valve having ports communicating with the air inlet when the valve has been partially lifted, and having ports communicating with the source of fuel when the valve is fully lifted, the valve when fully lifted closing the air inlet port in the casing and when fully lowered closing the fuel and air inlet ports.

3. In an internal combustion engine, a cylinder, and an inlet valve casing associated therewith, the casing being connected at its outer end to the outer end of the cylinder and having an air inlet port and a fuel inlet port, a hollow piston valve operating within the casing and having a valve head at its outer end seating against the upper end of the casing, the hollow valve having three spaced pistons and being formed between two of said pistons with inlet openings adapted to register with the air inlet port when the valve is partially opened and between the other pair of said pistons with an inlet port adapted to register with the fuel inlet opening when the valve is fully raised, and engine controlled means for reciprocating said valve to cause the partial opening of the valve and the admission of air, then cause a further movement of the valve to prevent the admission of air and permit the admission of fuel, and then cause the full closing of said valve.

OTTO HOOVER.